United States Patent
Townley et al.

(10) Patent No.: US 11,394,414 B2
(45) Date of Patent: Jul. 19, 2022

(54) METHOD OF WIRELESS INTERFERENCE MITIGATION WITH EFFICIENT UTILIZATION OF COMPUTATIONAL RESOURCES

(71) Applicant: BAE SYSTEMS Information and Electronic Systems Integration Inc., Nashua, NH (US)

(72) Inventors: Martin M. Townley, Middletown, NY (US); Jonathan P. Beaudeau, Littleton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/852,750

(22) Filed: Apr. 20, 2020

(65) Prior Publication Data
US 2021/0328611 A1     Oct. 21, 2021

(51) Int. Cl.
*H04B 1/10*     (2006.01)

(52) U.S. Cl.
CPC .................. *H04B 1/1081* (2013.01)

(58) Field of Classification Search
CPC .................................................. H04B 1/1081
See application file for complete search history.

(56) References Cited

U.S. PATENT DOCUMENTS 5,259,030 A * 11/1993 Francis ................ H04K 3/228
                                                                          342/16

5,796,779 A     8/1998   Nussbaum et al.
5,859,870 A * 1/1999   Tsujimoto ............ H04B 1/707
                                                                          375/143

(Continued)

FOREIGN PATENT DOCUMENTS

WO     2019/226736 A1     11/2019

OTHER PUBLICATIONS

Office Action for U.S. Appl. No. 16/852,631, dated Sep. 11, 2020, 8 Pages.

(Continued)

*Primary Examiner* — Jaison Joseph
(74) *Attorney, Agent, or Firm* — Maine Cernota & Rardin; Gary McFaline

(57) ABSTRACT

A method of mitigating interference in a received wireless signal by adaptive digital filtering efficiently deploys computational resources by using at least one of a DDC, weight generator, and scrubber to perform calculations necessary to generate a plurality of output streams. Embodiments transition a weight generator and scrubber between receiver frequencies according to a known frequency hopping pattern of an FHSS transmission. Other embodiments dedicate scrubbers to receiver frequencies while transitioning a weigh generator between the frequencies to generate sets of weights that can be persistently used by the scrubbers. Embodiments generate sets of weights according to one received multipath signal copy, and then apply the generated weights to filter additional multipath copes received at the same frequency. Various embodiments dedicate a DDC to each receive frequency to form a bank of down-converted outputs, from among which each weigh generator can select primary and reference inputs.

20 Claims, 14 Drawing Sheets

(56) References Cited

U.S. PATENT DOCUMENTS

| | | | |
|---|---|---|---|
| 6,415,001 B1* | 7/2002 | Li | H03D 7/166 |
| | | | 375/219 |
| 6,771,701 B1 | 8/2004 | Klindworth et al. | |
| 6,940,897 B2* | 9/2005 | Shaikh | H03H 17/0294 |
| | | | 375/232 |
| 7,346,134 B2 | 3/2008 | Smith | |
| 7,936,851 B2* | 5/2011 | Renfors | H04L 25/03159 |
| | | | 375/346 |
| 7,957,496 B2 | 6/2011 | Loiseau et al. | |
| 8,160,119 B2 | 4/2012 | Chevalier et al. | |
| 8,204,164 B1* | 6/2012 | Furman | H04L 25/03038 |
| | | | 375/350 |
| 9,344,125 B2 | 5/2016 | Kpodzo et al. | |
| 9,947,337 B1* | 4/2018 | Wang | G10L 21/0232 |
| 10,651,891 B1* | 5/2020 | Gardiner | H04B 7/2621 |
| 2001/0054974 A1* | 12/2001 | Wright | H03F 1/3247 |
| | | | 341/144 |
| 2003/0007553 A1* | 1/2003 | Fifield | H04B 1/0032 |
| | | | 375/232 |
| 2004/0081248 A1* | 4/2004 | Parolari | H04L 1/0003 |
| | | | 375/259 |
| 2006/0035593 A1* | 2/2006 | Leeds | G10L 19/265 |
| | | | 455/67.13 |
| 2006/0244528 A1* | 11/2006 | Pickerd | H03F 3/68 |
| | | | 330/126 |
| 2009/0202024 A1* | 8/2009 | Inoue | H04B 1/1661 |
| | | | 375/347 |
| 2010/0150275 A1 | 6/2010 | Dubash et al. | |
| 2010/0183048 A1* | 7/2010 | Hamamura | H04B 1/7143 |
| | | | 375/130 |
| 2010/0289688 A1* | 11/2010 | Sherman | H04K 3/28 |
| | | | 342/16 |
| 2011/0305306 A1* | 12/2011 | Hu | H03H 21/0021 |
| | | | 375/350 |
| 2012/0140685 A1 | 6/2012 | Lederer et al. | |
| 2014/0169501 A1* | 6/2014 | Nazarathy | H04L 25/02 |
| | | | 375/316 |
| 2017/0093375 A1* | 3/2017 | Onkar | H03H 17/04 |
| 2019/0140749 A1 | 5/2019 | Kim et al. | |
| 2019/0363819 A1* | 11/2019 | Cooper | H04K 3/25 |
| 2020/0409820 A1* | 12/2020 | Kana | G01S 19/03 |

OTHER PUBLICATIONS

Notice of Allowance for U.S. Appl. No. 16/852,631, dated Feb. 3, 2021, 17 Pages.
International Search Report, PCT/US21/28112, dated Jul. 27, 2021, 17 pages.

* cited by examiner

METHOD OF WIRELESS INTERFERENCE MITIGATION WITH EFFICIENT UTILIZATION OF COMPUTATIONAL RESOURCES

RELATED APPLICATIONS

This application is related to U.S. application Ser. No. 16/852,631, filed on Apr. 20, 2020, which is herein incorporated by reference in its entirety for all purposes.

FIELD

The disclosure relates to apparatus and methods of interference mitigation in wireless communications, and more particularly to methods that implement adaptive filters in field programmable gate arrays.

BACKGROUND

Wireless communications, including message communications as well as GPS and other communications, can be subject to any of several different types of interference. For example, so-called "multipath" propagation interference can arise when a signal is reflected from various intervening obstacles during transit so that a plurality of multipath "copies" of the message arrive at the receiver at multiple times via multiple paths. Interference can also arise due to competing transmissions that are broadcast either inadvertently or maliciously on the same frequency or frequencies as the signal of interest. In particular, malicious "jamming" signals that are broadcast by an antagonist may be either simple "blocking" signals that attempt to overwhelm the signal of interest, or an antagonist may attempt to "spoof" legitimate signals of interest, for example by recording actual signals of interest and then re-broadcasting them at a delayed time.

Frequency Hopping Spread Spectrum (FHSS) communication is sometimes implemented in an attempt to avoid or mitigate the effects of interference, especially jamming interference. In FHSS communication, messages are transmitted in a series of pulses or timeslots that hop in a pseudo-random pattern that can only be anticipated by an intended receiver who is in possession of a designated hopping pattern decryption key. If the selected FHSS frequencies extend over a significant bandwidth, it may be difficult for a jammer to broadcast a jamming signal that is sufficiently powerful to block the signal of interest while also being sufficiently wideband to intercept most or all of the selected hopping frequencies.

Nevertheless, while an antagonist may not be able to determine the frequency hopping pattern of an FHSS transmission, the antagonist may be able to enumerate the plurality of specific frequencies over which the FHSS signal is being transmitted. The antagonist may then transmit a plurality of narrow band, high power jamming signals simultaneously over several or all of the FHSS frequencies. This type of multi-frequency jamming can also occur for example when an antagonist seeks to simultaneously block a plurality messages being transmitted separately over a plurality of communication frequencies.

One approach that can be a powerful tool for mitigating interference in wireless communications is to implement an adaptive filter in the receiver. Adaptive filters are a class of digital filters that iteratively alter their parameters to minimize the mean squared error between the filter output and a desired signal. The most common adaptive filter algorithms are the Least Mean Square (LMS) algorithm and the Recursive Least Square (RLS) algorithm, where the RLS algorithm offers a higher convergence speed compared to the LMS algorithm, but at the cost of higher computational complexity.

With reference to FIG. 1A, an adaptive digital filter 100 also referred to herein as a "mitigator" 100 is implemented within a receiver, typically accepts an input data stream 116 from a Digital Down Converter (DDC) 102 that removes the carrier frequency from an analog signal that is received by an analog front end (including e.g. an antenna, low-noise amplifier, filters, mixers, etc) and digitized by an analog to digital converter (ADC) 104. The input data stream 116 that is provided by the DDC 102 is directed to a "weight generator" 106 that iteratively calculates an optimal set of "weights" 108 that are directed to a "scrubber" 110, and that define the properties of the digital filter 100. The input data stream 116 that is provided by the DDC 102 is also directed to the scrubber 110, which applies the filter function to the input data stream 116. Essentially, the scrubber 110 subtracts an approximation of the jamming signal from the input data stream 116 to create an output data stream 112 that is a close approximation to the signal of interest.

The output data stream 112 is fed back 114 to the weight generator 106 so that the weights 108 can be iteratively adjusted until they converge on an optimal solution. The adaptive filter 100 thereby uses feedback 114 in the form of an error signal to refine its weights 108, and thereby its transfer function. In general, this adaptive process involves the use of a "cost" function that is a criterion for improving the efficiency of the filter, to satisfy an algorithm. Also, the cost function determines how to adapt the filter transfer function to reduce the cost on the next iteration. The mean square of the of the error portion of the filtered output data stream 112 is often used as the cost function. The weights 108 of the adaptive filter 100 are adjusted by the weight generator 106 until the error, i.e. the cost, is minimized. Accordingly, there are two input signals 116, 114 to the weight generator 106 that are sometimes referred to as the primary 116 and the reference 114 input, respectively.

Depending on the specific implementation, any of several approaches can be used to determine a degree of success of a given set of adaptive digital filter weights in subtracting a jamming signal from a signal of interest, so that appropriate feedback 114 can be provided to the weight generator 106. For example, self-correction features such as checksums included in the signal of interest can be used to determine residual error rates of the filtered signal 112. In addition, valid signals of interest can be distinguished from spoofed signals based on features such as digital signatures and transmit times encoded within the received messages.

Due to the required speed, computational power, and adaptability, it is often desirable to implement an adaptive digital filter using a resource platform that provides a plurality of computational resources which can be configured as needed to perform specialized data processing that is computationally intensive. Examples include platforms that include an array of digital signal processors (DSPs), an array of central processing unit "cores," and a field programmable gate array (FPGA). However, while an FPGA or similar computational resource platform is often ideal for implementing an adaptive digital filter for interference mitigation, due to the speed and processing capabilities of such computational resources, nevertheless computational resources are always finite, and the heavy requirements for arithmetic signal processing can result in a high utilization of computational resources.

With reference to FIG. 1B, if it is necessary to apply adaptive filters 100 simultaneously to a plurality of frequencies F1, F2, F3, etc., for example when applied to FHSS communication, the requirement for FPGA computational resources can grow linearly with the number of frequencies.

Furthermore, with reference to FIG. 1C, if it is also necessary to eliminate the effects of multipath propagation interference, then it may be necessary to replicate the front end of the receiver so that each of the plurality of multipath message copies, corresponding to the plurality of paths that are traversed by the signal, can be separately received. As a result, it may be necessary to implement a plurality of adaptive filters or mitigators 100 for each of the receive frequencies.

To summarize, if C multipath copies of a signal are received over F frequencies, then a total of C×F mitigators may be needed. The result can be very large requirements for computational resources.

What is needed, therefore, is a method of applying adaptive digital filters to a received signal or signals so as to optimize the suppression of interference while utilizing computational resources as efficiently as possible.

SUMMARY

The present disclosure is a method of applying adaptive digital filters to a received signal or signals so as to optimize the suppression of interference while utilizing computational resources as efficiently as possible. In contrast to known methods in which separate mitigators and digital down converters (DDC's) are dedicated to each combination of receive frequency, multipath message copy, and reference frequency, the presently disclosed method shares computational resources between more than one such combination, thereby requiring fewer computational resources.

More specifically, the presently disclosed method is directed to environments wherein a requirement for computational resources is increased due to at least one of the following:
a. a requirement to apply adaptive filtering to a plurality of receive frequencies ("channels"), for example due to Frequency Hopping Spread Spectrum ("FHSS") communication;
b. a requirement to apply adaptive filtering separately to a plurality of multipath copies of a message; and
c. a requirement to provide reference data derived from a plurality of frequencies to a plurality of weight generators, thereby requiring that the outputs of a plurality of Digital down Converters ("DDC's") be directed to each of the weight generators.

In embodiments, rather than organizing computational resources into complete "mitigators," the present method separately manages the deployment of computational resources as "weight generators" and "scrubbers." In other words, the present method does not necessarily maintain a one-to-one correspondence between weight generators and scrubbers.

In addition, embodiments of the present disclosure assume that once a weight generator has determined an optimal set of weights for a certain receive frequency, the weights will remain valid for that receive frequency, including all multipath copies received on that frequency, at least during some finite period of validity $t_v$. Based on this assumption, and assuming that $t_v$ is longer than the time required to generate an optimized set of weights $t_w$, it is therefore possible for a single weight generator to provide weights for approximately $t_v/t_w$ additional receiver frequencies.

For example, if a plurality of distinct messages are received over a plurality of frequencies, and in the extreme case where the calculated weights remain valid indefinitely ($t_v$ is infinite), then a single weight generator can be successively used to generate an optimized set of weights for each of the receive frequencies, after which the weight generator is no longer needed, and it is only necessary to dedicate a separate scrubber to each of the frequencies. It should be noted that, for a typical mitigator that comprises a dedicated weight generator and a scrubber, the weight generator will consume approximately 90% of the computational resources of the mitigator. Accordingly, for this example, after a brief initial period during which the weights are generated, the requirement for computational resources will be reduced by 90%.

In similar cases where weights are only valid for a finite time period $t_v$, then so long as $t_v$ is longer than the time N×$t_w$ required to generate optimized weights for all of the N frequencies, then a single weight generator can be used to periodically regenerate the weights for each of the N frequencies. And if $t_v$ is too short to allow a single weight generator to regenerate the weights for all of the channels within the period $t_v$, then the number of weight generators can be increased accordingly. Nevertheless, the number of weight generators will typically be far less than the number of receive frequencies.

Similar embodiments can be implemented for applications that require scrubbing of a communication that is transmitted using FHSS. At any given time during data transmission of an FHSS communication, signal will be present at only one frequency. For that reason, embodiments require only one weight generator and one scrubber, wherein the scrubber and weight generator are shifted between the FHSS frequencies according to the hopping pattern of the FHSS transmission. If the weights remain valid indefinitely, then the weight generator need only generate one set of weights for each of the FHSS frequencies, after which it is no longer needed. If $t_v$ is short, then the weight generator can continue to be shifted between the FHSS frequencies together with the scrubber according to the FHSS hopping pattern.

In some cases an FHSS communication comprises a synchronization mode (synch search mode) that precedes the data communication (data mode), wherein a signal is transmitted simultaneously on more than one of the FHSS frequencies during the synch search. In some embodiments, it can therefore be necessary to provide a scrubber for each of the frequencies that will be simultaneously active during the synch search. However, embodiments require only a single weight generator that is able to generate the weights for all of the FHSS frequencies that are used during the synch search. For example, if the synch signal is transmitted simultaneously on N frequencies during a time that is longer than N×$t_w$, then a single weight generator can be used to sequentially generate optimized weights for all of the frequencies.

And if the synch information is a known series of pulses transmitted sequentially over a plurality of the FHSS frequencies according to a known pattern, and if the weights for a given frequency can be calculate in a time $t_w$ that is shorter than the length of one of the synch pulses, then a single weight generator and scrubber can be used during the synch search without loss of any synchronization data by shifting the weight generator and scrubber between the frequencies according to the known pattern.

A similar approach can be applied to cases where a plurality of multipath copies of a given transmission are received. Rather than dedicating a separate mitigator to each of the multipath copies, whereby a separate weight generator is used to calculate weights for each of the multipath copies, embodiments calculate only a single set of weights during reception of the first multipath copy at a given frequency, after which the weights are re-applied to the other multipath copies that are subsequently received on that frequency. In the case of FHSS transmissions, all of the multipath copies will follow the same hopping pattern. However, the multipath delays may be sufficient to cause the copies to be distributed over more than one of the FHSS frequencies at any given time. For that reason, embodiments provide a plurality of scrubbers, and some embodiments provide a dedicated scrubber for each of the FHSS frequencies. Nevertheless, reuse of the same weights for some or all of the multipath copies received over a given frequency allows embodiments to limit the number of weight generators, and in some embodiments only one weight generator is required.

As is described in more detail in U.S. application Ser. No. 16/852,631, filed on Apr. 20, 2020, which is also assigned to the present Applicant and is incorporated by reference herein by reference in its entirety for all purposes, the efficacy of an adaptive digital filter for mitigating common template multichannel (CTMC) interference can sometimes be improved by providing to the weight generator reference data derived from frequency channels that do not carry the signal of interest (SOI), but which do carry correlated jamming signals, in addition to the primary data that is derived from the frequency channel in which the SOI is present.

Similarly, if a plurality of signals of interest are being received simultaneously on a plurality of jammed frequency channels, and if the jamming that is present in the plurality of frequency channels is correlated, while the signals of interest are not correlated, then the weights that are generated by a weight generator that is assigned to mitigate jamming on a selected "primary" frequency channel can sometimes be improved by providing to the weight generator data obtained from one or more of the other frequency channels as reference data. In such cases, the signals of interest that are present in the "reference" data will not be correlated to the signal of interest that is carried by the primary frequency channel, and will be treated as if it were noise, while the correlated jamming patterns in the reference data will be used to improve the generated weights.

When implementing this strategy, it can be necessary to dedicate a separate Digital Down Converter (DDC) to each of the reference frequency channels, as well as to the primary frequency channel. While embodiments implement strategies for reducing the number of required weight generators, as described above, nevertheless in some implementations a plurality of weight generators are required. In such cases, the number of DDC's that are required can be the product of the number of weight generators times the number of inputs (primary plus reference) that are required by each of the weight generators. In some cases, the resulting large number of DDC's can consume a significant quantity of computational resources.

In embodiments, the consumption of computing resources by DDCs is reduced by sharing of the output of at least one DDC among a plurality of weight generators. Specifically, in applications wherein a plurality of weight generators are active, and wherein generation of a set of weights by any one of the weight generators requires down-converted input from at least one reference frequency channel in addition to the primary frequency channel, then embodiments dedicate only a single DDC to each of the frequency channels, and the down-converted data from each of the DDC's is made available to a plurality, or in embodiments to all, of the weight generators.

For example, if signals are being received on N frequency channels, if a separate weight generator is dedicated to each of the N frequency channels for mitigating the jamming on that frequency channel, and if down-converted data from all of the N frequency channels is required to generate each set of weights, then in embodiments instead of dedicating N DDC's to each of the weight generators, which would require total of N×N DDC's, only one DDC is dedicated to each of the N frequencies, and the data from each of the N DDCs is made available to all of the N weight generators. Accordingly, only N DDCs are required, rather than N×N DDCs.

More generally, embodiments of the present disclosure are applicable to implementations where M mitigators are implemented, and where each of the M mitigators requires reference data from N frequency channels to operate. Rather than associating N DDCs with each of the M mitigators to produce the required N sets of reference data, thereby requiring M×N DDCs, embodiments create a single bank of reference DDCs, each fixed to a single frequency channel, so that each mitigator is able to select its required reference input from the data that is made available by the bank of DDCs. According to this approach, in embodiments additional mitigators can be added to the system without the need to add additional reference DDCs. In embodiments, each of the mitigators selects an optimal set of reference frequencies from among the choices that are made available from the bank of fixed reference DDCs. The result is a scalable design where the DDCs are maintained at a fixed number (e.g. at the number of FHSS frequencies) while the number of mitigators can be increased as needed.

A first general aspect of the present disclosure is a method of mitigating interference in a received wireless signal. The method includes providing an analog to digital converter (ADC) configured to create a digital input data stream from the received wireless signal. The method further includes providing a computing device that includes a data input configured to receive the digital input data stream, a plurality of computational resources, and a plurality of data outputs, each of the plurality of data outputs being configured to output a filtered output stream for which interference is mitigated. The method further includes configuring the computational resources so as to provide a digital down converter (DDC) that is configured to provide a down-converted data stream derived from the digital input data stream, a weight generator configured to generate an optimized set of adaptive filter weights according to the down-converted data stream and according to filtering feedback, and a scrubber configured to apply digital filtering to the down-converted data stream according to the adaptive filter weights so as to produce at least one of the filtered output streams. According to this first general aspect, the scrubber is further configured to provide the filtering feedback to the weight generator, and at least one of the DDC, the weight generator, and the scrubber is configured to perform calculations necessary to produce a plurality of the filtered output streams.

In embodiments, the plurality of filtered output streams include a first output stream and a second output stream derived respectively from applying digital filtering to distinct first and second of the down-converted data streams corresponding to first and second wireless signals received respectively at distinct first and second wireless receiver frequencies.

In some of these embodiments, the received wireless signals include a signal of interest received at the first and second wireless frequencies during respective first and second timeslots of a frequency hopping spread spectrum (FHSS) protocol, and wherein the weight generator is configured to generate optimized sets of adaptive digital filter weights applicable to the first and second down-converted data streams during the first and second timeslots respectively.

In some of these embodiments the scrubber is configured to apply the digital filtering to the first down-converted data stream according to the first optimized set of adaptive filter weights during the first timeslot, and to apply the digital filtering to the second down-converted data stream according to the second optimized set of adaptive filter weights during the second timeslot. And in some of these embodiments the weight generator is configured to calculate a first optimized set of adaptive filter weights applicable to the first down-converted data stream, said first optimized set of adaptive filter weights remaining valid during a time tv after the generation thereof, and to calculate during the time tv a second optimized set of adaptive filter weights that are applicable to the second down-converted data stream. In some of these embodiments the method includes configuring the computational resources to provide a first scrubber and a second scrubber, where the first scrubber is configured to apply the digital filtering to the first down-converted data stream according to the first optimized set of adaptive filter weights, while the second scrubber is configured to apply the digital filtering to the second down-converted data stream according to the second optimized set of adaptive filter weights.

In any of the above embodiments, the filtered output streams can include a first multipath output stream and a second multipath output stream that correspond respectively to first and second down-converted data streams derived from first and second multipath copies of a signal of interest received at a wireless receiver frequency at distinct first and second multipath times, the second multipath time being delayed relative to the first multipath time. In some of these embodiments the weight generator is configured to calculate an optimized set of adaptive filter weights according to the first down-converted data stream, said optimized set of adaptive filter weights remaining valid during a time tv after the generation thereof, and wherein during the time tv the computing device is configured to apply the digital filtering to both of the first and second down-converted data streams according to the optimized set of adaptive filter weights.

In any of the above embodiments, the method can further include configuring the computational resources to provide a plurality of digital down converters (DDCs) that are configured to provide a plurality of down-converted data streams derived from a plurality of digital input data streams, wherein each of the digital input data streams is associated uniquely with a corresponding one of the DDCs and with a corresponding one of the down-converted data streams, and configuring the computational resources so as to provide a plurality of weight generators, each of the weigh generators being configured to generate an optimized set of adaptive filter weights according to a plurality of the down-converted data streams, the down-converted data streams being provided as a bank of data streams from among which each of the weight generators selects a primary down-converted data stream to which an optimized set of adaptive filter weights generated by the weight generator is applied, and at least one reference down-converted data stream.

A second general aspect of the present disclosure is an apparatus configured for mitigating interference in a received wireless signal. The apparatus includes an analog to digital converter (ADC) configured to create a digital input data stream from the received wireless signal, and a computing device. The computing device includes a data input configured to receive the digital input data stream, a plurality of computational resources, and a plurality of data outputs, each of the plurality of data outputs being configured to output a filtered output stream for which interference is mitigated. The computational resources are configured so as to provide a digital down converter (DDC) that is configured to provide a down-converted data stream derived from the digital input data stream, a weight generator configured to generate an optimized set of adaptive filter weights according to the down-converted data stream and according to filtering feedback, and a scrubber configured to apply digital filtering to the down-converted data stream according to the filter weights so as to produce at least one of the filtered output streams, the scrubber being further configured to provide the filtering feedback to the weight generator. And at least one of the DDC, the weight generator, and the scrubber is configured to perform calculations necessary to produce a plurality of the filtered output streams.

In embodiments, the plurality of filtered output streams includes a first output stream and a second output stream derived respectively from digital filtering of distinct first and second down-converted data streams corresponding to first and second wireless receiver frequencies. In some of these embodiments the weight generator is configured to generate optimized sets of adaptive digital filter weights applicable to the first and second down-converted data streams respectively during first and second timeslots of a frequency hopping spread spectrum (FHSS) protocol.

In some of these embodiments the scrubber is configured to apply the digital filtering to the first down-converted data stream according to the first optimized set of adaptive filter weights during the first timeslot, and to apply the digital filtering to the second down-converted data stream according to the second optimized set of adaptive filter weights during the second timeslot. And in various of these embodiments the weight generator is configured to calculate a first optimized set of adaptive filter weights applicable to the first down-converted data stream, and subsequently to calculate a second optimized set of adaptive filter weights that are applicable to the second down-converted data stream. In some of these embodiments the computational resources are configured to provide a first scrubber and a second scrubber, and wherein the first scrubber is configured to apply the digital filtering to the first down-converted data stream according to the first optimized set of adaptive filter weights, and wherein the second scrubber is configured to apply the digital filtering to the second down-converted data stream according to the second optimized set of adaptive filter weights.

In any of the above embodiments, the computing device can be configured to provide among the filtered output streams a first multipath output stream and a second multipath output stream that correspond respectively to first and second down-converted data streams derived from first and second multipath copies of a signal of interest received at a wireless receiver frequency at distinct first and second multipath times, the second multipath time being delayed relative to the first multipath time. In some of these embodiments the weight generator is configured to calculate an optimized set of adaptive filter weights according to the first down-converted data stream, and the scrubber is configured to apply the digital filtering to both of the first and second down-converted data streams according to the optimized set of adaptive filter weights.

In any of the above embodiments, the computational resources can be configured to provide a plurality of digital down converters (DDCs) that provide a plurality of down-converted data streams derived from a plurality of digital input data streams, wherein each of the digital input data streams is associated uniquely with a corresponding one of the DDCs and with a corresponding one of the down-converted data streams, and the computational resources can be further configured to provide a plurality of weight generators, each of the weigh generators being configured to generate an optimized set of adaptive filter weights according to a plurality of the down-converted data streams, the down-converted data streams being provided as a bank of data streams from among which each of the weight generators is able to select a primary down-converted data stream to which an optimized set of adaptive filter weights generated by the down converter will be applicable, and at least one reference down-converted data stream.

A third general aspect of the present disclosure is a computer program product that includes one or more non-transitory machine-readable mediums having instructions encoded thereon that, when executed by one or more processors, result in a plurality of operations for mitigating interference in a received wireless signal so as to provide a plurality of filtered output streams that are interference mitigated. The operations include creating a digital input data stream from the received wireless signal via an analog to digital converter (ADC), deriving a down-converted data stream from the digital input data stream via a digital down converter (DDC), generating an optimized set of adaptive filter weights via a weight generator according to the down-converted data stream and according to filtering feedback, applying digital filtering via a scrubber to the down-converted data stream according to the filter weights so as to produce at least one of the filtered output streams, and providing by the scrubber of the filtering feedback to the weight generator. These operations include performing by at least one of the DDC, the weight generator, and the scrubber of calculations that are necessary to produce a plurality of the filtered output streams.

In embodiments there is no one-to-one correspondence between the weight generators and the scrubbers.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is a method of adaptively filtering a received signal or signals so as to optimize the suppression of interference while utilizing computational resources as efficiently as possible. Instead of dedicating separate mitigators and digital down converters (DDC's) to each combination of receive frequency, multipath message copy, and reference frequency, the presently disclosed method shares computational resources between more than one such combination, thereby requiring fewer computational resources.

More specifically, the presently disclosed method is directed to environments wherein a requirement for computational resources is increased due to at least one of the following:
  d. a requirement to apply adaptive filtering to a plurality of receive frequencies, for example due to Frequency Hopping Spread Spectrum ("FHSS") communication;
  e. a requirement to apply adaptive filtering separately to a plurality of multipath copies of a message; and
  f. a requirement to provide reference data derived from a plurality of frequencies to a plurality of weight generators, thereby requiring that the outputs of a plurality of Digital down Converters ("DDC's") be directed to each of the weight generators.

Figure 1A:
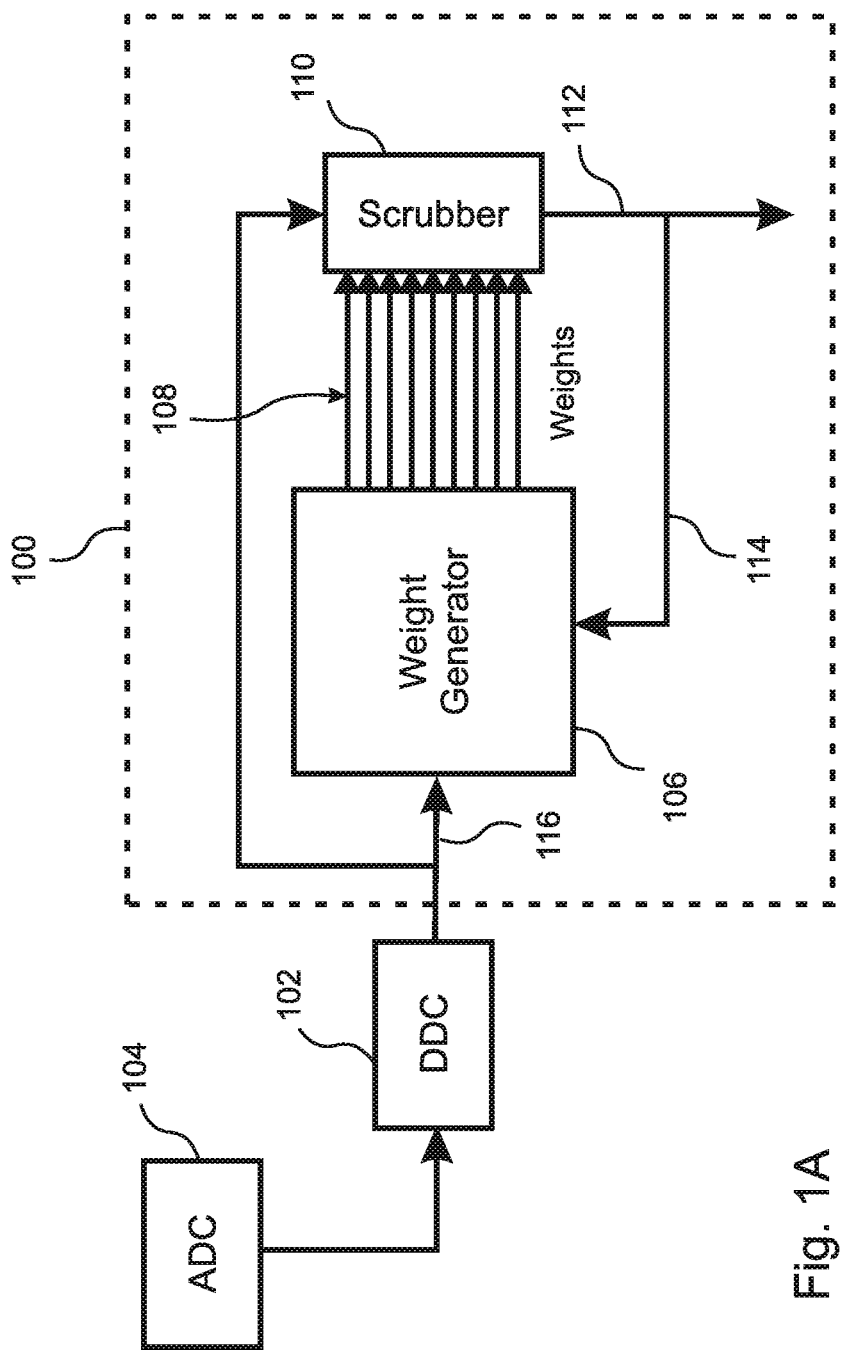
FIG. 1A is a block diagram of an adaptive digital filter of the prior art.
Figure 1B:
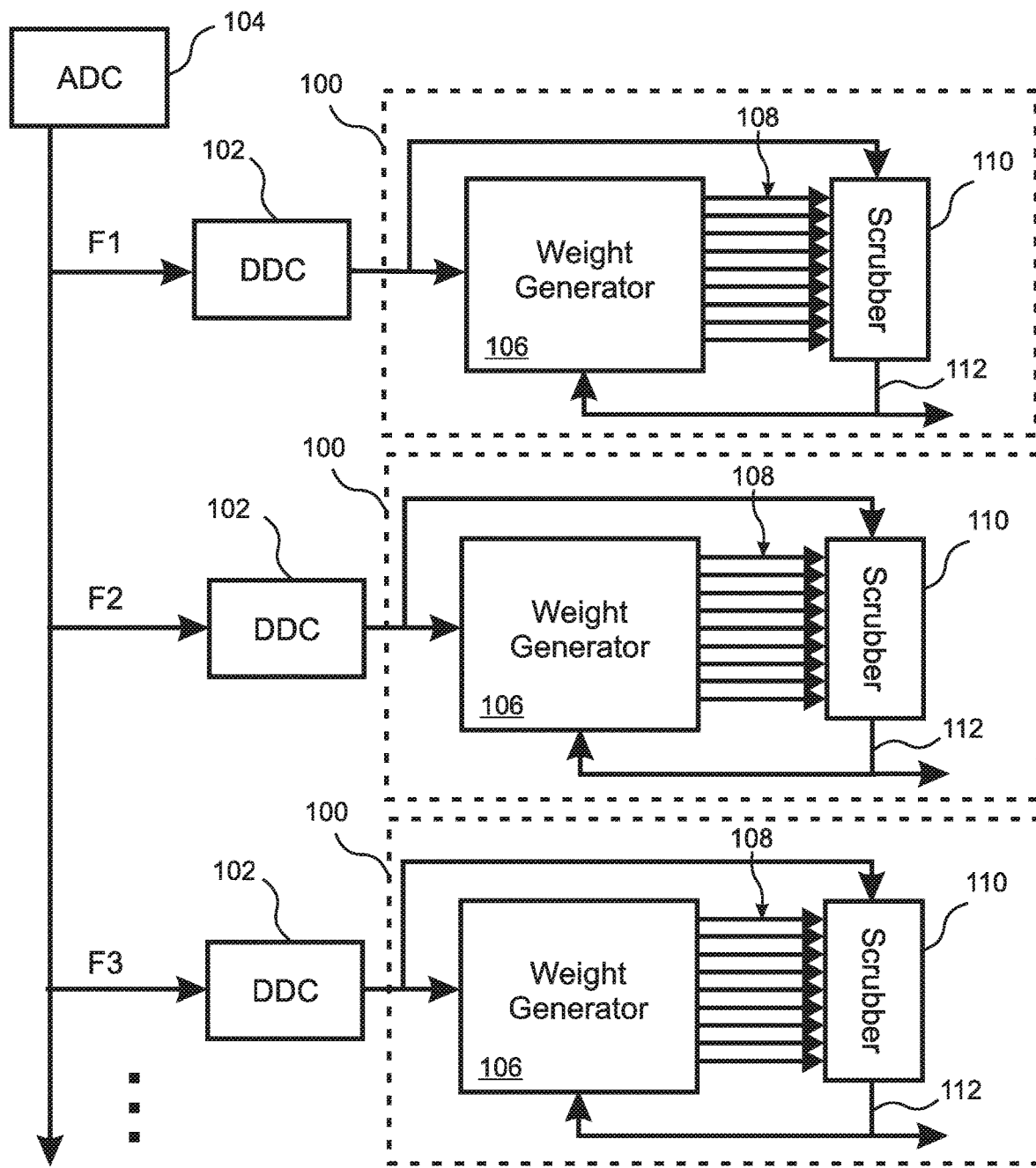
FIG. 1B is a block diagram illustrating a plurality of adaptive digital filters dedicated to a corresponding plurality of receiver frequencies according to the prior art.
Figure 2:
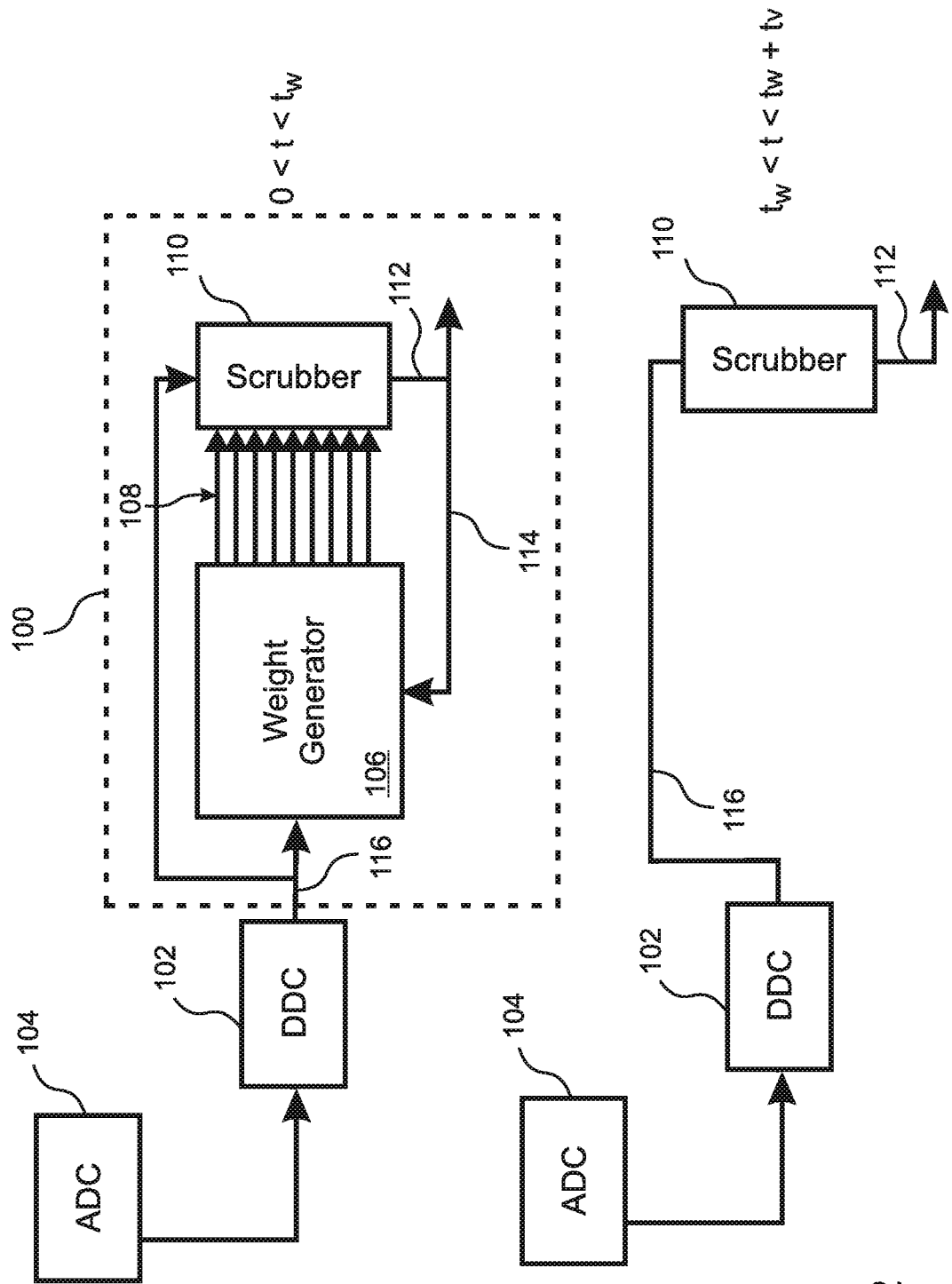
FIG. 2 is a pair of block diagrams that illustrates generation of an optimized set of adaptive filter weights during a time $t_w$, and application of the optimized set of adaptive filter weights by a scrubber during a validity time $t_v$ following generation of the weights during $t_w$, according to an embodiment of the present disclosure, wherein operation of a weight generator is not required during the time $t_v$.

With reference to FIG. 2, according to the present invention an analog signal is received by an analog front end (including e.g. an antenna, low-noise amplifier, filters, mixers, etc) 103, digitized by an ADC 104, and then the carrier frequency is removed by a digital down converter 102. Some embodiments of the present disclosure assume that once a weight generator 106 has determined an optimal set of weights 108 for a certain frequency channel during a time $t_w$, the weights 108 will remain valid for that frequency at least during some finite period of validity $t_v$, where $t_v$ is longer than $t_w$. As a result, the computational resources of the weight generator 106 can be redirected to other tasks during the time $t_v$. During the time period from t=0 to t=$t_w$, as illustrated in the top diagram of FIG. 2, the mitigator 100 operates as in FIG. 1A, whereby the weight generator 106 generates and optimizes a set of adaptive filter weights 108 according to the input data stream 116 and according to feedback 114 received from the output 112 of the scrubber 110. However, after a set of optimized weights 108 has been generated at t=$t_w$, the scrubber 110 can continue to operate without further input from the weight generator 108 using the stored set of optimized weights 108 during the remaining period of weight validity from t=$t_w$ until t=$t_w$+$t_v$.

It should be noted that, for a typical mitigator 100 that comprises a dedicated weight generator 106 and scrubber 110, the weight generator 106 will consume approximately 90% of the computational resources of the mitigator 100. Accordingly, after the initial period $t_w$ illustrated by the upper diagram of FIG. 2 during which the optimized adaptive filter weights are generated, the requirement for computational resources in the lower diagram of FIG. 2 is reduced by 90%.

In embodiments, rather than organizing computational resources as complete "mitigators," the present method separately manages the deployment of computational resources as "weight generators" and "scrubbers." In other words, the present method does not necessarily maintain a one-to-one correspondence between weight generators and scrubbers.

For example, if N distinct messages are received over a N receive frequencies F1, F2, F3 . . . FN, and in the extreme case where the optimized adaptive filter weights 108 remain valid indefinitely ($t_v$ is infinite), then with reference to FIGS. 3A through 3C, a single weight generator 106 can be successively used to generate an optimized set of adaptive filter weights 108 for each of the receive frequencies, i.e. for F1 (FIG. 3A), then for F2 (FIG. 3B), then for F3 (FIG. 3C), and so forth, after which it is only necessary, at most, to dedicate a separate scrubber 110 to each of the frequencies, thereby reducing the requirement for computational resources by at least 90%.

In similar cases where the generated weights 108 are only valid for a finite time period $t_v$, then so long as $t_v$ is longer than N×$t_w$, a single weight generator 106 can still be used to periodically and successively regenerate the weights 108 for all of the N frequencies. And if $t_v$ is shorter than N×$t_w$, then the number of weight generators 106 can be increased accordingly. Nevertheless, the number of weight generators 106 will typically be less than N.

Similar embodiments can be implemented for applications that require adaptive digital filtering of a communication that is transmitted using FHSS. At any given time during the data transmission of an FHSS communication, the signal of interest will be present on only one of the FHSS frequencies. For that reason, instead of dedicating a separate mitigator 100 to each of the FHSS frequencies, with reference to FIGS. 4A through 4C embodiments require only one mitigator 100, wherein the mitigator 100 is shifted between the FHSS frequencies according to the known FHSS hopping pattern, so that the data input of the mitigator 100 is always directed to whichever down-converted data stream is currently carrying the signal of interest.

Figure 4A:
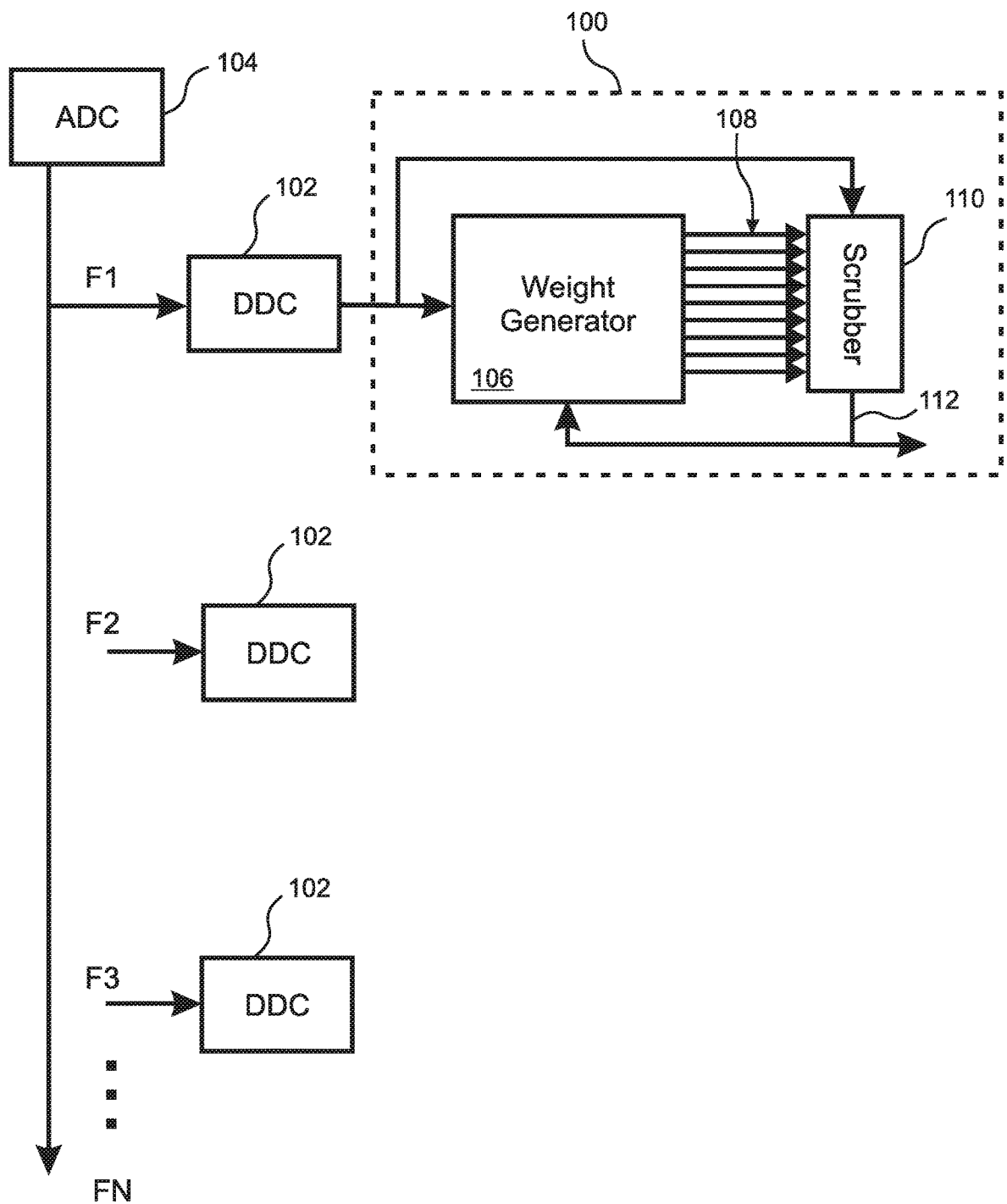
FIG. 4A is a block diagram that illustrates application of an adaptive digital filter comprising a weight generator and a scrubber to a first receiver frequency during a first timeslot of a FHSS hopping pattern during which a signal of interest is present at the first receiver frequency according to an embodiment of the present disclosure.
Figure 4B:
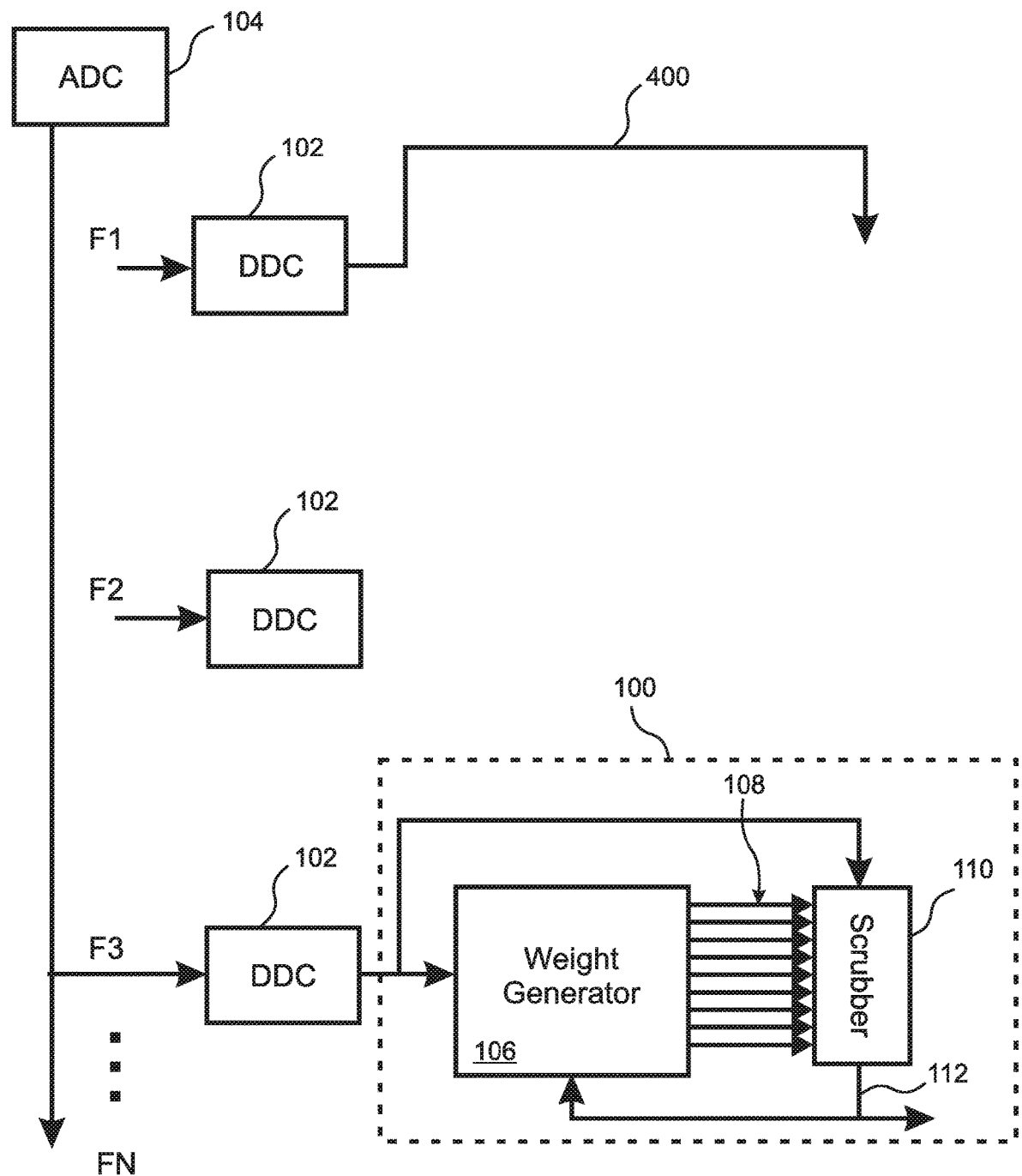
FIG. 4B is a block diagram that illustrates application of the adaptive digital filter of FIG. 4A to a third receiver frequency during a second timeslot of the FHSS hopping pattern of FIG. 4A during which the signal of interest is present at the third receiver frequency according to an embodiment of the present disclosure.
Figure 4C:
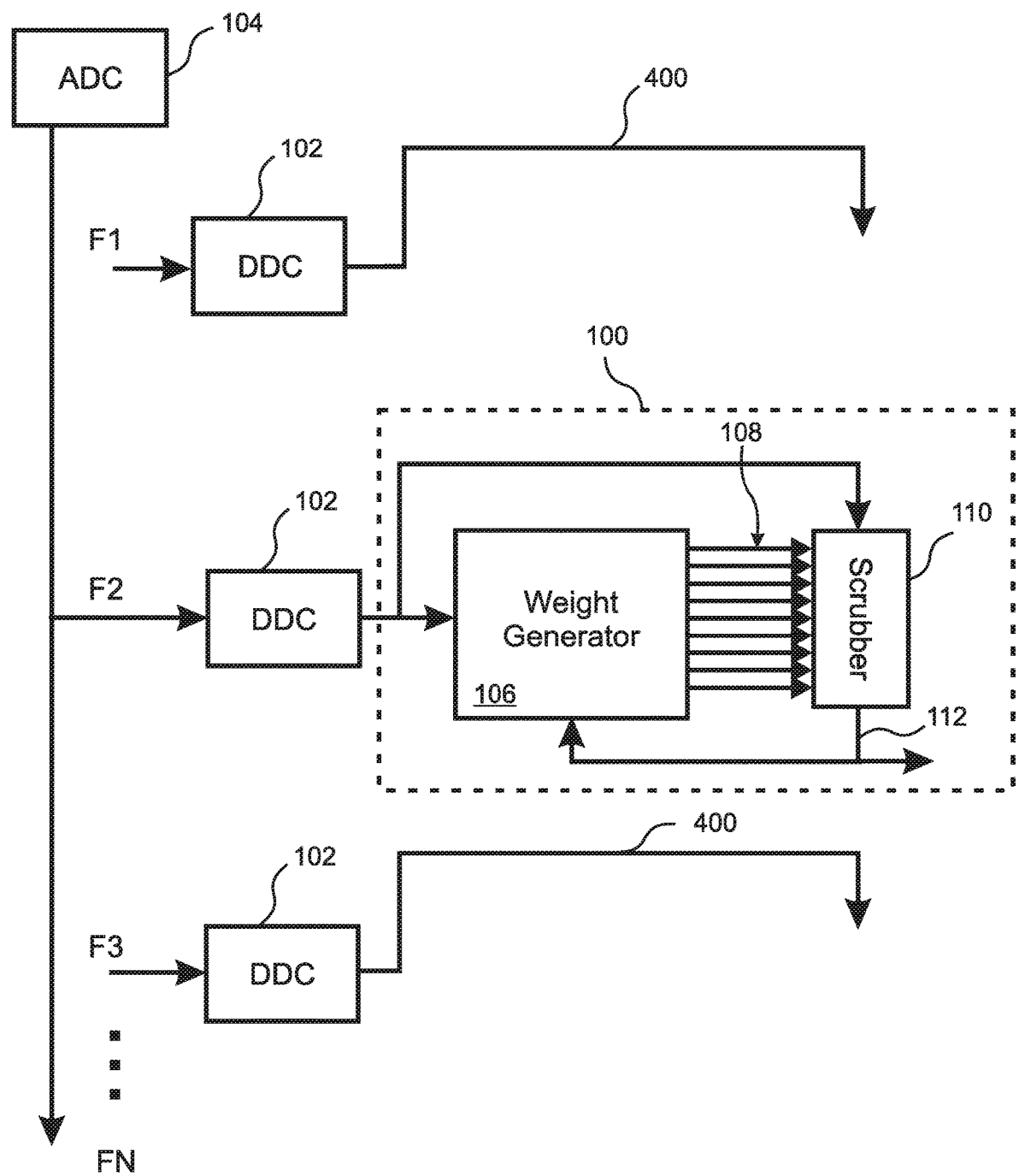
FIG. 4C is a block diagram that illustrates application of the adaptive digital filter of FIG. 4A to a second receiver frequency during a third timeslot of the FHSS hopping pattern of FIG. 4A during which the signal of interest is present at the second receiver frequency according to an embodiment of the present disclosure.
Figure 4D:
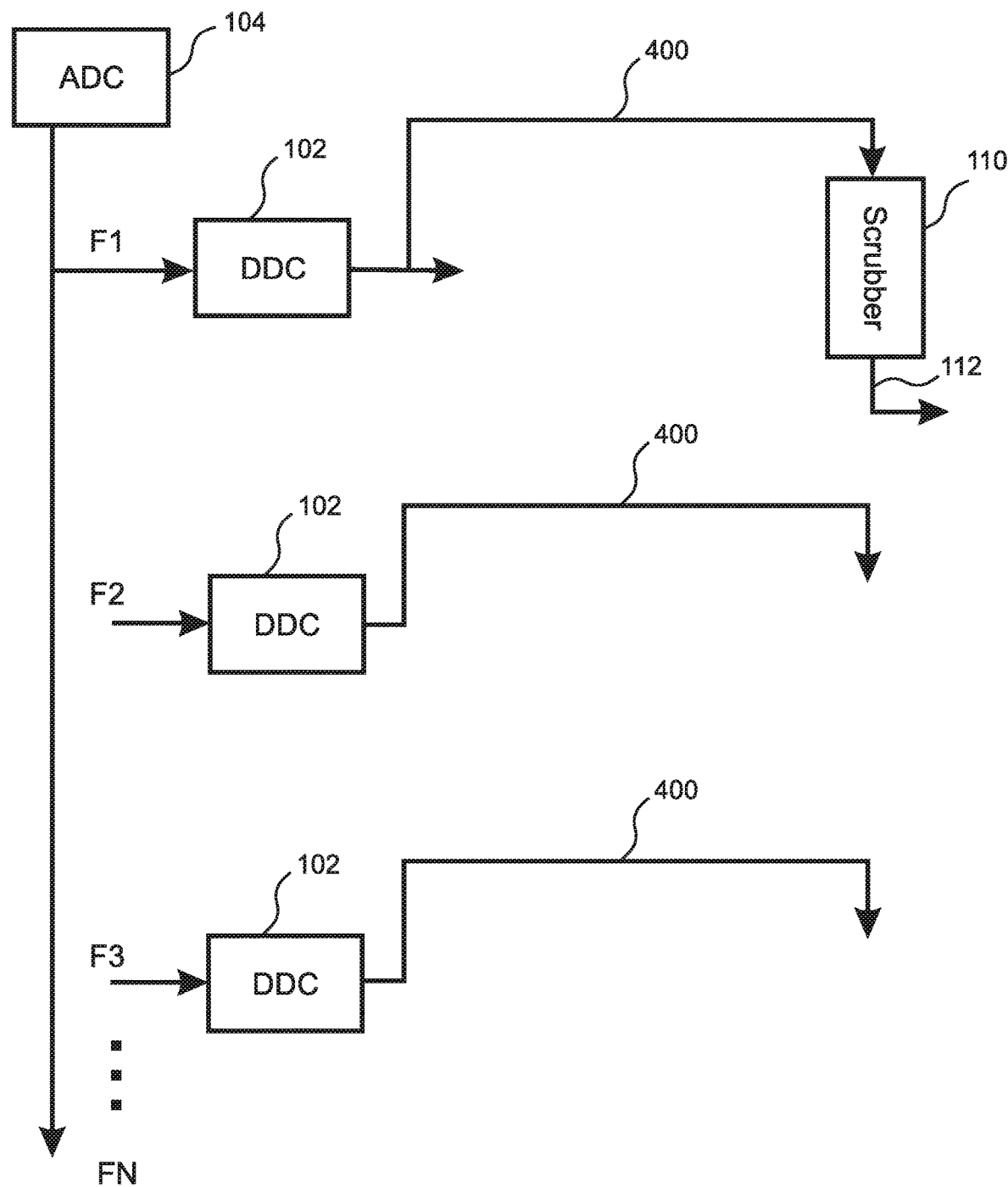
FIG. 4D is a block diagram that illustrates application of a digital filter according to an embodiment of the present disclosure by the scrubber of FIG. 4A to the first receiver frequency during a fourth timeslot of the FHSS hopping pattern of FIG. 4A during which the signal of interest is present at the first receiver frequency, the digital filter being applied according to a set of optimized digital filter weights generated by the weight generator of FIG. 4A during the first timeslot, wherein the weight generator of FIG. 4A is not utilized during the fourth timeslot.

In the example of FIGS. 4A through 4C, the mitigator 100 transitions according to the FHSS hopping pattern from F1 (FIG. 4A) to F3 (FIG. 4B) to F2 (FIG. 4C), and in each case generates an optimized set of weights 108 for that frequency while the signal is being received. With reference to FIG. 4D, when the signal of interest returns to a frequency such as F1 for which a set of optimized weights 400 has previously been generated, if $t_v$ is long then the previously generated weights remain valid and the weight generator 106 is no longer needed for that frequency. In such cases, after weights have been generated for all of the FHSS frequencies, it remains necessary only to continue to transition the scrubber 110 between the FHSS frequencies according to the known hopping pattern, thereby further reducing the requirement for computational resources.

If the optimized adaptive filter weights 108 remain valid indefinitely, i.e. $t_v$ is effectively infinite, then the weight generator 106 need only generate one set of weights 108 for each of the FHSS frequencies, after which the weight generator 106 is no longer needed. If $t_v$ is short, then optimized weights 108 can be periodically regenerated by the weight generator 106 as shown in FIGS. 4A through 4C.

In some cases, an FHSS communication comprises a synchronization mode (synch search mode) that precedes the data communication (data mode), wherein signal is transmitted simultaneously on more than one of the FHSS frequencies during the synch search. In some embodiments, similar to FIGS. 3A through 3C, it can therefore be necessary to provide a scrubber 110 for each of the frequencies that will be simultaneously active during the synch search. However, as in FIGS. 3A through 3C, embodiments require only a single weight generator 106 that is able to generate the weights 108 for all of the FHSS frequencies that are used during the synch search.

Figure 3A:
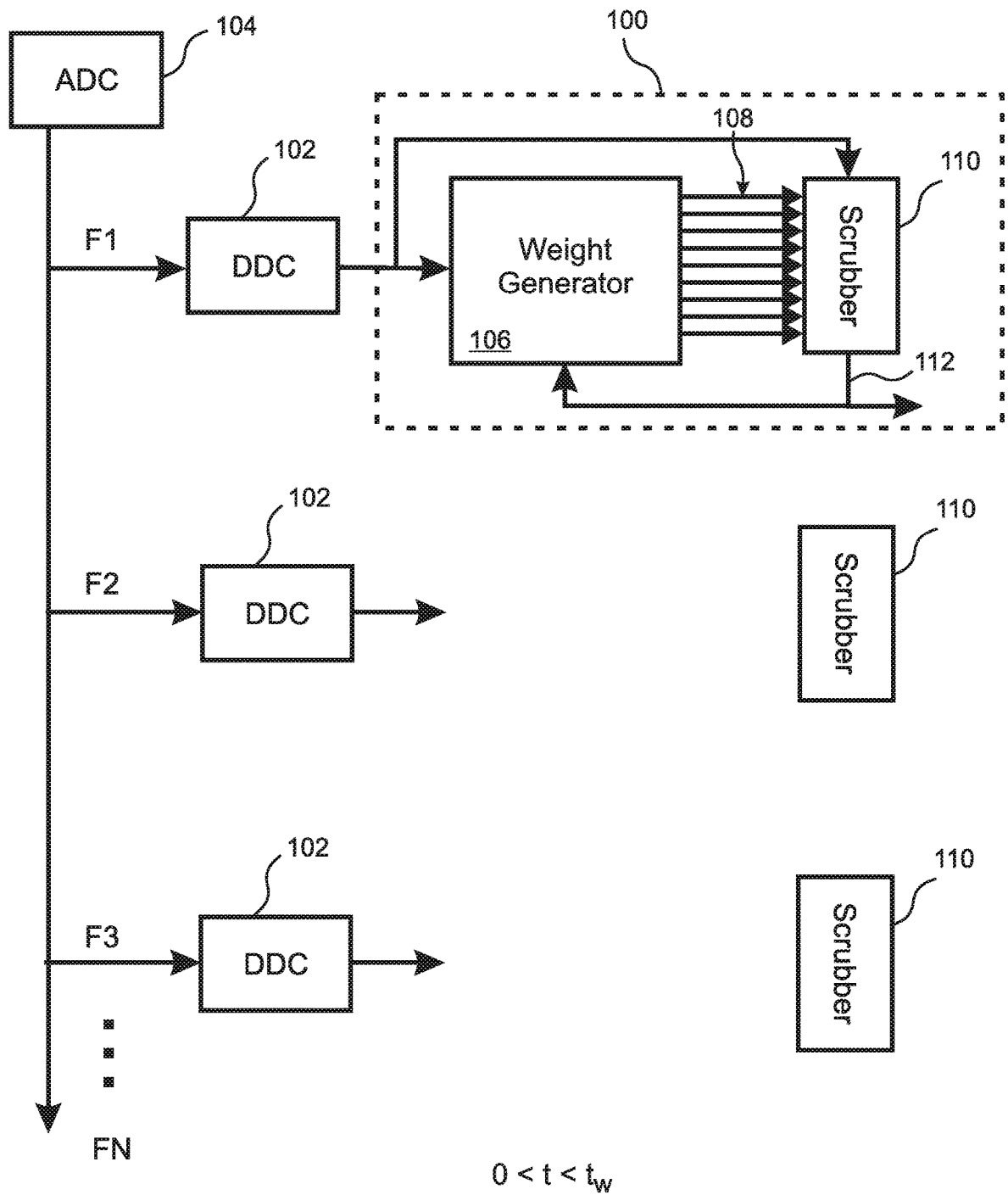
FIG. 3A is a block diagram that illustrates generation by a weight generator of an optimized set of adaptive filter weights applicable to a first receiver frequency during a first time interval of duration $t_w$ according to an embodiment of the present disclosure.
Figure 3B:
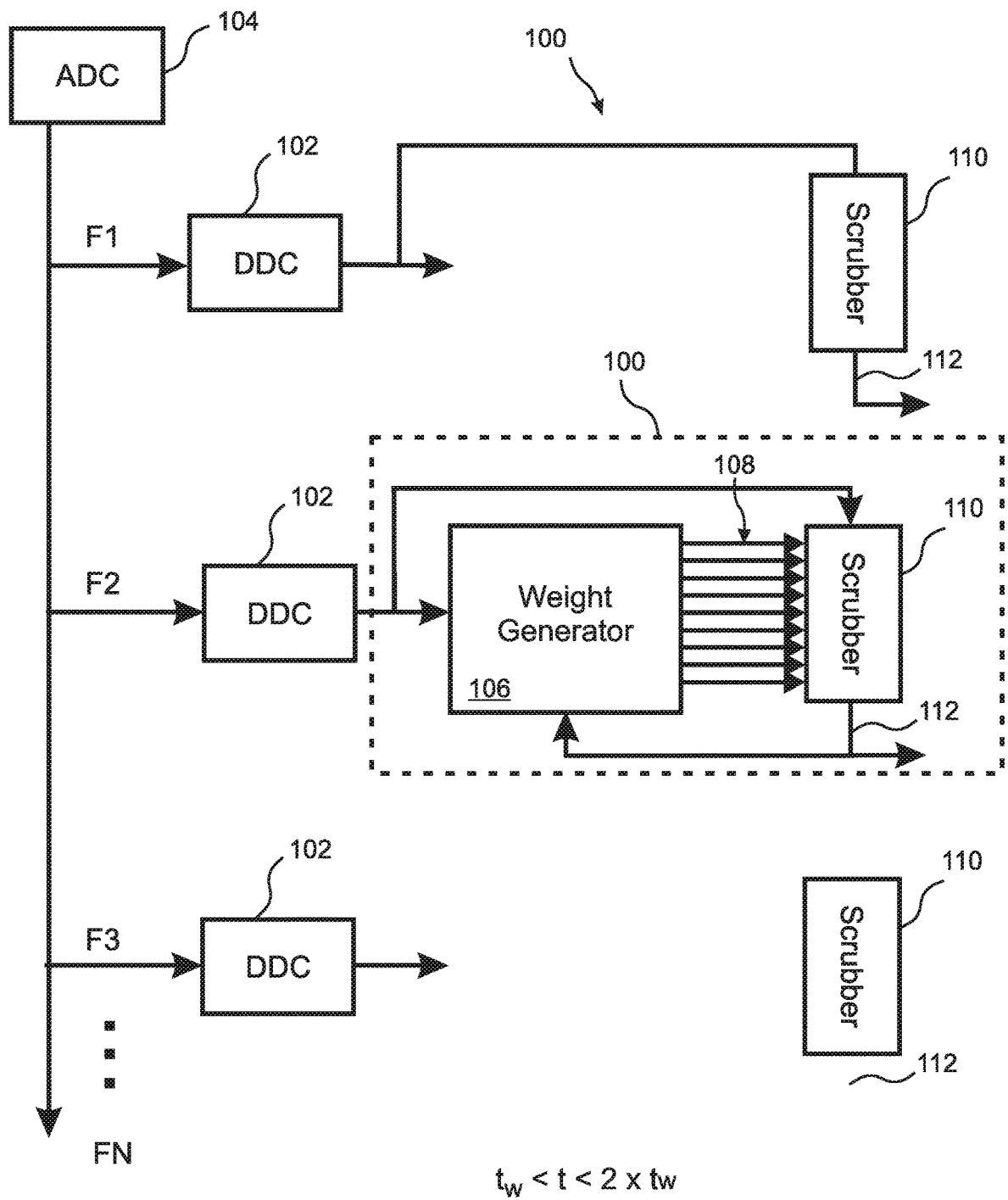
FIG. 3B is a block diagram that illustrates generation by the weight generator of FIG. 3A of an optimized set of adaptive filter weights applicable to a second receiver frequency during a second time interval of duration $t_w$ according to an embodiment of the present disclosure.
Figure 3C:
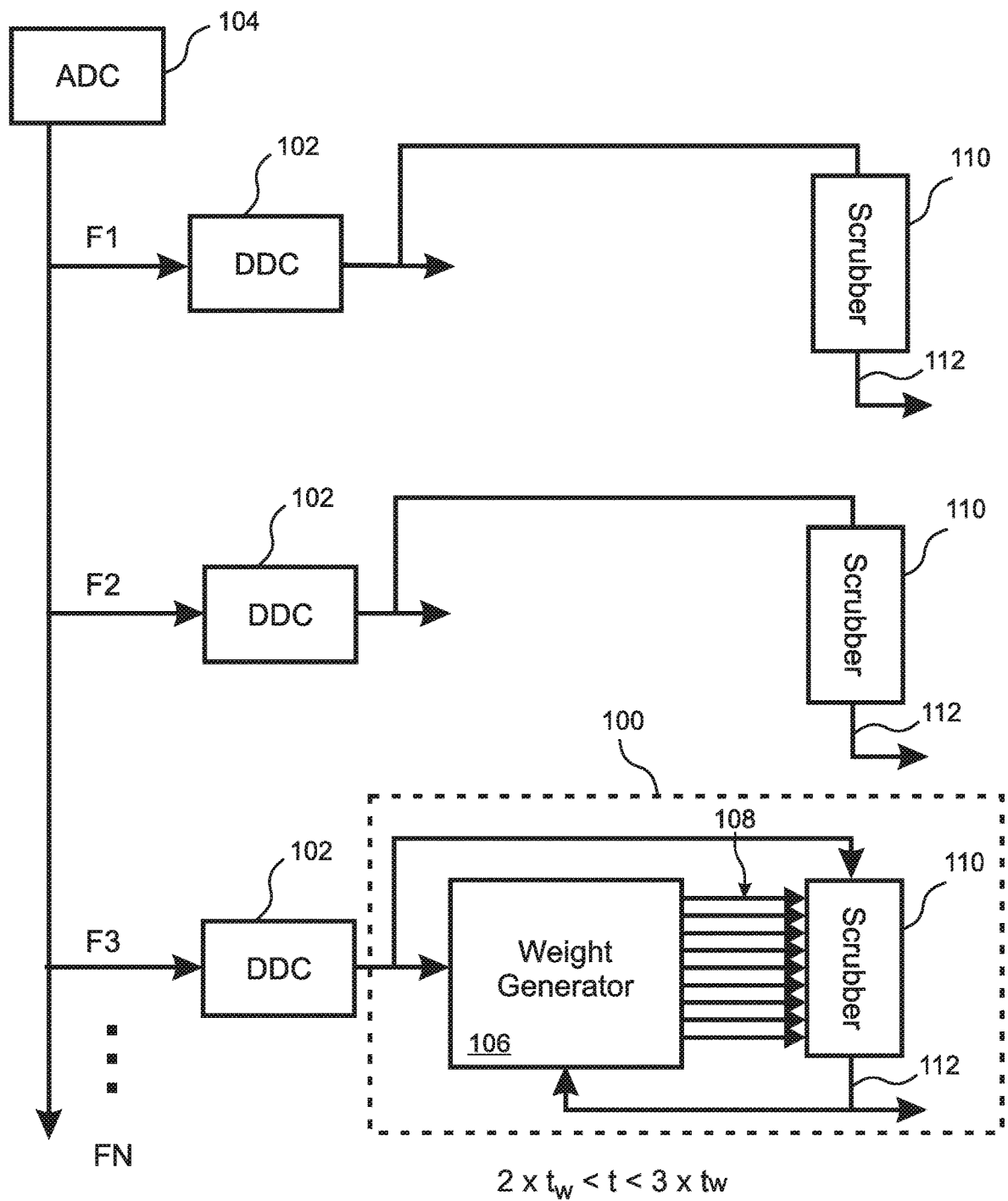
FIG. 3C is a block diagram that illustrates generation by the weight generator of FIG. 3A of an optimized set of adaptive filter weights applicable to a third receiver frequency during a third time interval of duration $t_w$ according to an embodiment of the present disclosure.

For example, if the synch signal is transmitted simultaneously on F frequencies during a time that is longer than F×$t_w$, then a single weight generator can be used to sequentially generate optimized weights 108 for all of the FHSS frequencies in a manner similar to FIGS. 3A through 3C. On the other hand, if the synch information is a known series of pulses transmitted sequentially over a plurality of the FHSS frequencies according to a known pattern, and if the weights 108 for a given frequency can be calculate in a time $t_w$ that is shorter than the length of one of the synch pulses, then a single weight generator 106 and scrubber 110 can be used during the synch search, without loss of any synchronization data, by shifting the weight generator 106 and scrubber 110 between the synch search frequencies according to the known pattern in a manner similar to FIGS. 4A through 4C.

Figure 1C:
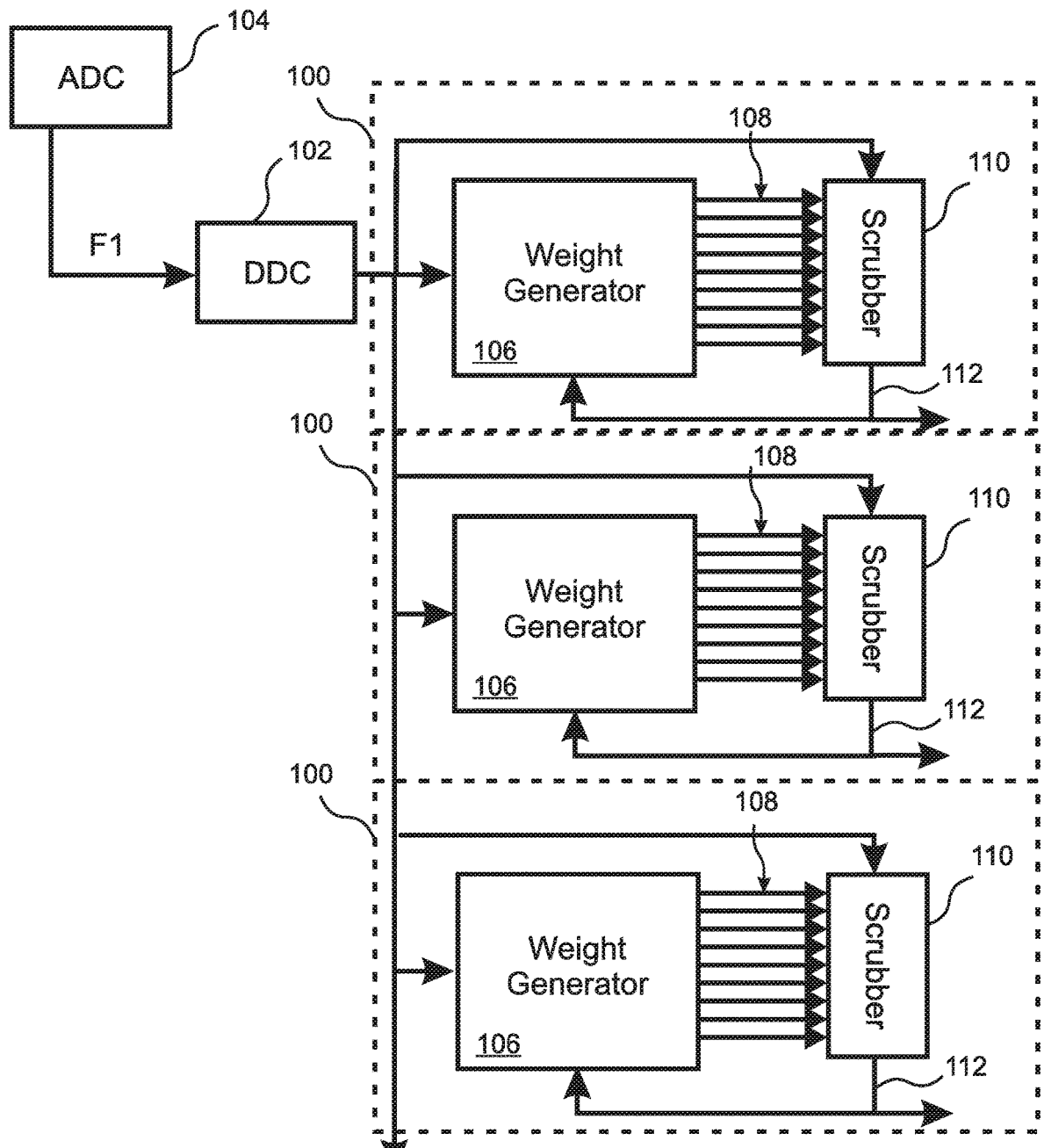
FIG. 1C is a block diagram illustrating a plurality of adaptive digital filters dedicated to a corresponding plurality of multipath copies of a signal received on a single receive frequency according to the prior art.

A similar approach can be applied to cases where a plurality of multipath copies of a given transmission are received. Rather than dedicating a separate mitigator 100 to each of the multipath copies, as shown in FIG. 1C, whereby a separate weight generator 106 is used to calculate weights 108 for each of the multipath copies, instead, with reference to FIG. 5, embodiments calculate only a single set of weights 108 during reception of the first multipath copy 500 at a given frequency, after which the weights 108 are re-applied to the other multipath copies 502, 504 that are subsequently received on that frequency.

Figure 5:
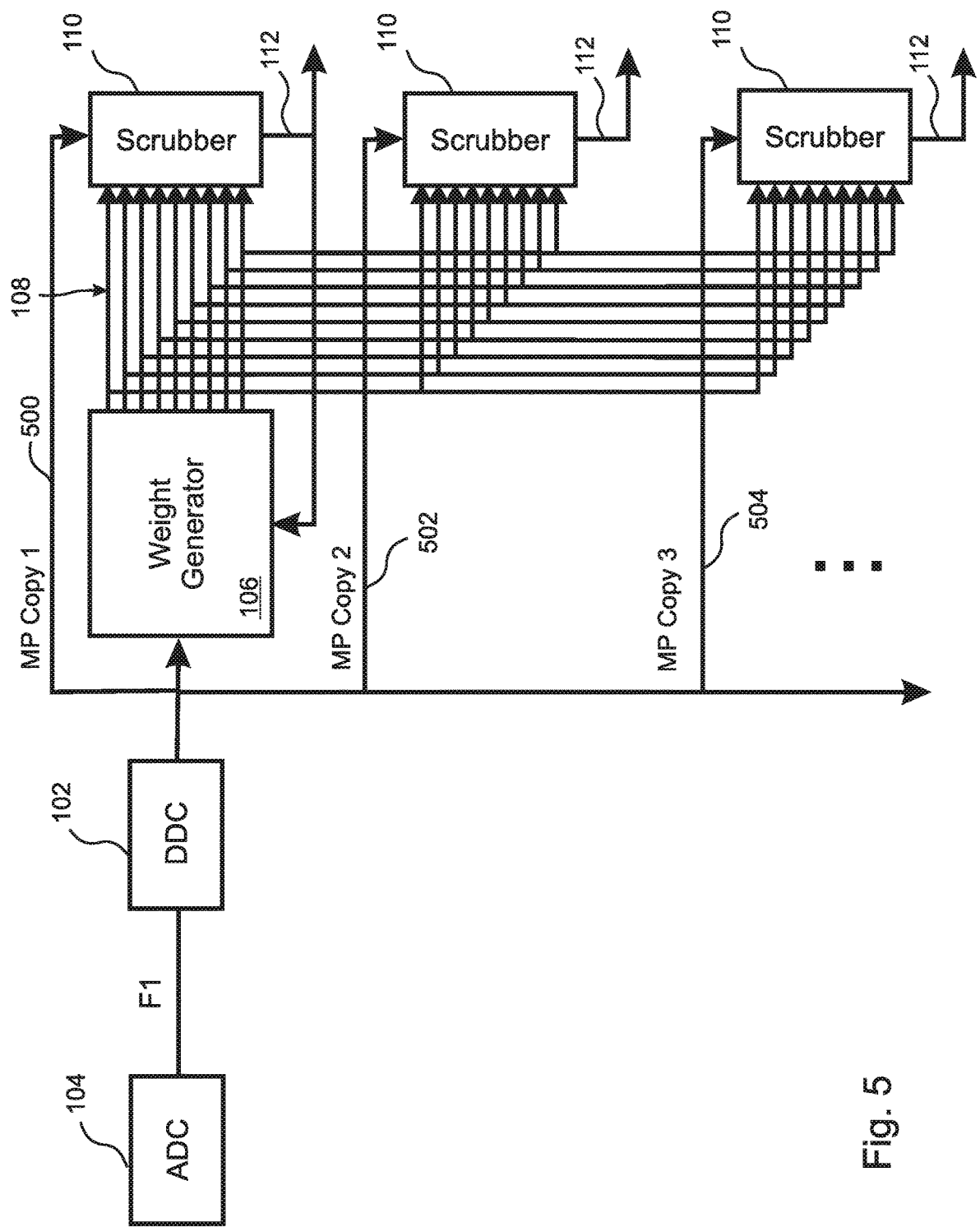
FIG. 5 is a block diagram that illustrates generation of a set of optimized adaptive filter weights by a weight generator according to a first multipath copy of a signal received at a receiver frequency, and application by a plurality of scrubbers according to the generated filter weights of an adaptive digital filter to a plurality of multipath copies of the signal received at the signal frequency according to an embodiment of the present disclosure.

In the case of FHSS transmissions, all of the multipath copies 500, 502, 504 will follow the same hopping pattern. However, the multipath delays may be sufficient to cause the copies to be simultaneously present in more than one of the FHSS frequencies at any given time. For that reason, embodiments provide a plurality of scrubbers 110. For example, the embodiment of FIG. 5 provides a dedicated scrubber 110 for each of the FHSS frequencies. Nevertheless, reuse of the same weights 108 for some or all of the multipath copies 500, 502, 504 that are received over a given frequency allows embodiments to limit the number of weight generators 106, whereby in some embodiments only one weight generator 106 is required.

While some embodiments of the present disclosure implement strategies for reducing the number of required weight generators 106, as described above, nevertheless in some implementations of the present method a plurality of weight generators 106 are required. For example, if CTMC jamming is directed to all of the hopping channels of an FHSS communication, and if it is not possible all for the FHSS channels to share a single weight generator, then it will be necessary to provide a separate weight generator for each of the FHSS channels. In some of these embodiments sharing of Digital Down Converters (DDCs) 102 is implemented.

In particular, as is described in more detail in U.S. application Ser. No. 16/852,631, filed on Apr. 20, 2020, which is also assigned to the present Applicant and is incorporated by reference herein in its entirety for all purposes, a jamming attack can include the transmission of jamming signals that are transmitted simultaneously on a plurality of frequency channels, where the jamming signals are derived from a "common template" jamming pattern, and may therefore be correlated with each other. Jamming attacks of this type are referred to herein as "common template multi-channel" jamming, or CTMC jamming.

For example, during the receipt of a single timeslot pulse of an FHSS communication, the signal of interest will be present only on one frequency channel, which can be referred to as the "SOI" frequency channel for that timeslot, while the jamming signal will likely be present on many or all of the FHSS frequency channels simultaneously.

Figure 6A:
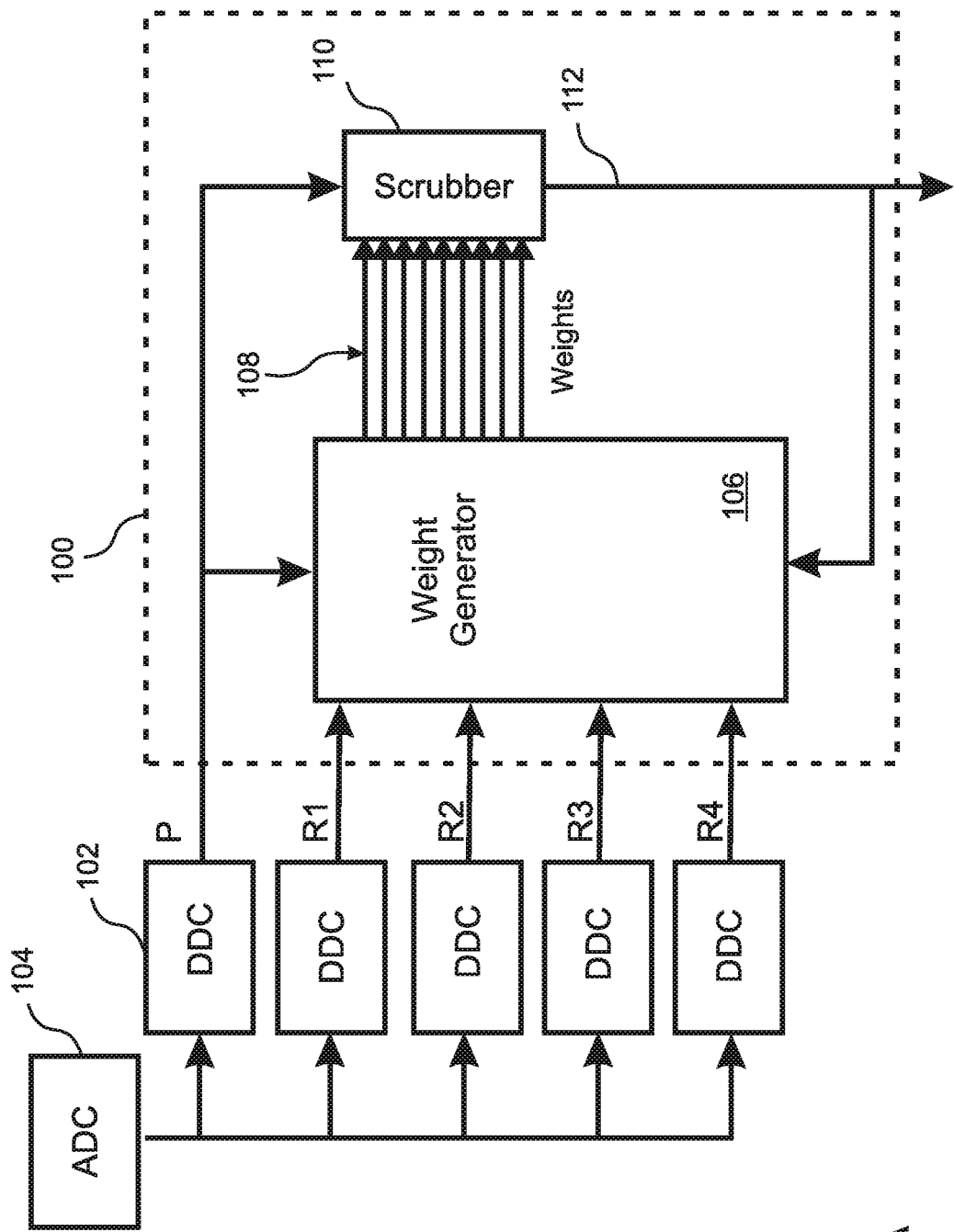
FIG. 6A is a block diagram that illustrates dedication of a plurality of DDCs to a single adaptive digital filter wherein the DDCs provide primary and reference data to the adaptive digital filter.

With reference to FIG. 6A, when attempting to mitigate CTMC jamming, in addition to directing "primary" data to the weight generator 106 from the SOI frequency channel, it can be beneficial to also provide to the weight generator 106 "reference" data obtained from some or all of the other CTMC channels in which correlated jamming signals are being transmitted. As shown in the figure, this approach requires that a single weight generator 106 receive data from a plurality of digital down converters (DDC's) 102.

Similarly, if a plurality of signals of interest are being received simultaneously on a plurality of jammed frequency channels, and if the jamming that is present in the plurality of frequency channels is correlated, while the signals of interest are not correlated, then the weights that are generated by a weight generator that is assigned to mitigate jamming on a selected "primary" frequency channel can sometimes be improved by providing to the weight generator data obtained from one or more of the other frequency channels as reference data. In such cases, the signals of interest that are present in the "reference" data will not be correlated to the signal of interest that is carried by the primary frequency channel, and will be treated as if it were noise, while the correlated jamming patterns in the reference data will be used to improve the generated weights.

When implementing this multi-channel "reference data" strategy, it can be necessary to dedicate a separate Digital Down Converter (DDC) 102 to each of the reference frequency channels, as well as to the primary frequency channel. Accordingly, this approach of providing reference data to each of the weight generators 106 will even further increase the utilization of computational resources. For example, if an FHSS communication is hopping between M frequencies, and the weight generators 106 each require input from N frequency channels (including the SOI frequency channel in addition to the reference frequency channels), then a total of M mitigators may be required, one for each FHSS channel, and a total of M×N DDC's will be required.

Figure 6B:
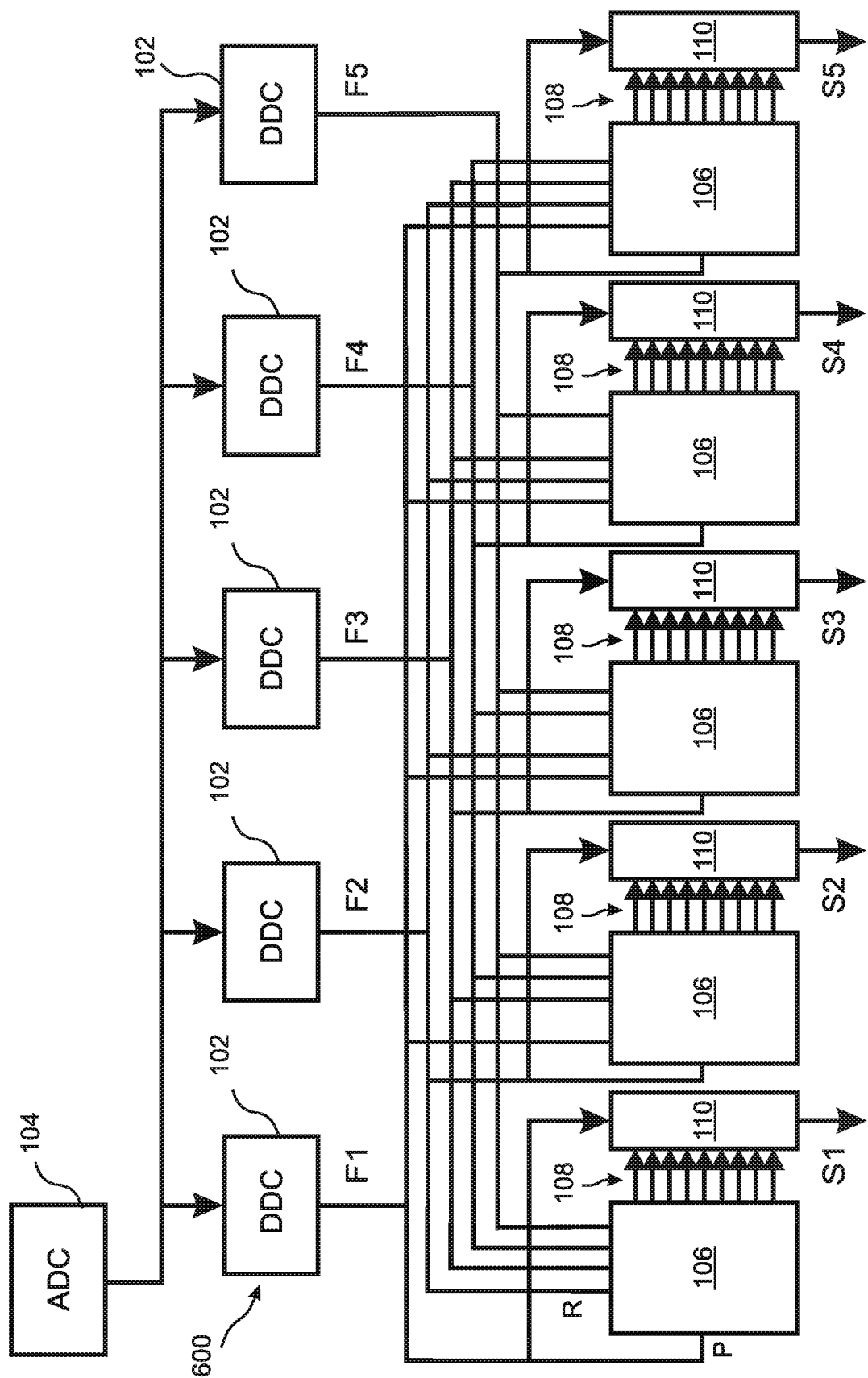
FIG. 6B is a block diagram that illustrates a plurality of DDCs forming a bank of down-converted data streams from which a plurality of adaptive digital filters are able to select primary and reference inputs used to generate sets of optimized adaptive filter weights according to an embodiment of the present disclosure.

With reference to FIG. 6B, embodiments of the present disclosure implement sharing of DDC resources in applications where a plurality of weight generators 106 are active, and wherein generation of a set of weights 108 by any one of the weight generators 106 requires down-converted input from a plurality of frequency channels, including input from a primary frequency channel for which optimized weights are being generated as well as data from at least one reference frequency channel. Rather than dedicating a plurality of DDCs 102 to each of the weight generators 106, embodiments of the present disclosure dedicate only a single DDC 102 to each of a plurality of frequency channels, and configures the DDCs 102 to provide a bank 600 of down-converted data streams from which all of the weight generators 106 are able to select their primary and reference inputs.

In the example of FIG. 6B, signals of interest are received on 5 frequency channels, a separate mitigator 100 (i.e. weight generator 106 and scrubber 110) is dedicated to each of the 5 frequency channels, and each of the mitigators 100 requires down-converted data from all of the 5 frequency channels in order to generate an optimized set of weights 108. For each of the weight generators 106, down-converted data from one of the five frequency channels (shown entering the weight generator 106 from the left) is considered to be the primary data corresponding to the frequency channel for which weights 108 are being generated by that weight generator 106, while the down-converted data from the other four frequency channels (shown entering the weight generator 106 from above) are used by the weight generator 106 as reference data, wherein the uncorrelated signals of interest in the reference channels are treated as noise, while the correlated jamming signals are used as reference data to optimize the generated weights 108.

Accordingly, in the embodiment of FIG. 6B, instead of dedicating 5 DDC's 102 to each of the weight generators 106, which would require a total of 25 DDC's 102, only one DDC 102 is dedicated to each of the 5 frequencies, and the data from each of the 5 DDCs 102 is made available as a data bank 600 to all 5 of the weight generators 106. Accordingly, only 5 DDCs 102 are required in the illustrated example, rather than 25 DDCs.

More generally, embodiments of the present disclosure are applicable to requirements where M weight generators 106 are implemented, and where each of the M weight generators 106 requires down-converted data from N frequency channels (including the SOI frequency channel and at least one reference frequency channel) to calculate optimal sets of weights 108. Rather than associating N DDCs 102 with each of the M weight generators 106 to produce the required N sets of data inputs, thereby requiring M×N DDCs, embodiments such as FIG. 6B create a single bank 600 of reference DDCs 102, each of which is dedicated to a single frequency channel, so that each weight generator 106 can select a primary input and an optimal set of reference inputs from any or all of the down-converted data streams that are made available by the DDC's 102 in the bank 600. In some of these embodiments, for example if each of the weight generators 106 requires input from only a subset of the DDC's 102, and/or if the number of frequency channels, and therefore the number of DDC's 102, remains fixed (e.g. for FHSS communication), then additional weight generators 106 can be added to the system as needed without being required to add more reference DDCs 102. The result can be a scalable approach wherein the number of DDCs 102 is fixed, while the number of weight generators 106 can be increased as needed.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

We claim:

1. An apparatus configured for mitigating interference in a received wireless signal, the apparatus comprising:
a data input configured to receive a digital input data stream that is derived from the received wireless signal;
a plurality of data outputs, each of the plurality of data outputs being configured to output a filtered output stream for which the interference is mitigated;
a digital down converter (DDC) that is configured to provide a down-converted data stream derived from the input data stream;
a weight generator that is configured to generate an optimized set of adaptive filter weights according to the down-converted data stream and according to filtering feedback;
and a scrubber that is configured to apply digital filtering to the down-converted data stream according to the adaptive filter weights so as to produce at least one of the filtered output streams, the scrubber being further configured to provide the filtering feedback to the weight generator, wherein the scrubber is configured to continue using the adaptive filter weights;
wherein at least one of the DDC, the weight generator, and the scrubber is configured to perform calculations necessary to produce a plurality of the filtered output streams,
and wherein the apparatus shares computational resources between the weight generator and the scrubber, wherein the computational resources of the weight generator are available for other tasks after the weight generator generates the adaptive filter weights and the scrubber continues using the adaptive filter weights without further input from the weight generator.

2. The apparatus of claim 1, wherein the plurality of filtered output streams include a first output stream and a second output stream derived respectively from digital filtering of a first down-converted data stream and a second down-converted data stream corresponding to first and second wireless receiver frequencies.

3. The apparatus of claim 2, wherein the weight generator is configured to generate the optimized set of adaptive filter weights applicable to the first down-converted data stream and the second down-converted data stream respectively during first and second timeslots of a frequency hopping spread spectrum (FHSS) protocol.

4. The apparatus of claim 3, wherein the scrubber is configured to apply the digital filtering to the first down-converted data stream according to a first optimized set of adaptive filter weights during the first timeslot, and to apply the digital filtering to the second down-converted data stream according to a second optimized set of adaptive filter weights during the second timeslot.

5. The apparatus of claim 2, wherein the weight generator is configured to calculate a first optimized set of adaptive filter weights applicable to the first down-converted data stream, and subsequently to calculate a second optimized set of adaptive filter weights that are applicable to the second down-converted data stream.

6. The apparatus of claim 5, wherein the scrubber is a first scrubber, and wherein the apparatus further comprises a second scrubber, the first scrubber being configured to apply the digital filtering to the first down-converted data stream according to the first optimized set of adaptive filter weights, and the second scrubber being configured to apply the digital filtering to the second down-converted data stream according to the second optimized set of adaptive filter weights.

7. The apparatus of claim 1, wherein
a computing device is configured to provide among the filtered output streams a first multipath output stream and a second multipath output stream that correspond respectively to first down-converted data streams and the second down-converted data streams derived from first and second multipath copies of a signal of interest received at a wireless receiver frequency at distinct first and second multipath times, the second multipath time being delayed relative to the first multipath time.

8. The apparatus of claim 7, wherein
the weight generator is configured to calculate the optimized set of adaptive filter weights according to the first down-converted data stream, and wherein the scrubber is configured to apply the digital filtering to both of the first and second down-converted data streams according to the optimized set of adaptive filter weights.

9. The apparatus of claim 1, wherein:
the apparatus includes a plurality of digital down converters (DDCs) that provide a plurality of down-converted data streams derived from a plurality of digital input data streams, wherein each of the digital input data streams is associated uniquely with a corresponding one of the DDCs and with a corresponding one of the down-converted data streams; and the apparatus includes a plurality of weight generators, each of the weight generators being configured to generate an optimized set of adaptive filter weights according to the plurality of the down-converted data streams; the down-converted data streams being provided as a bank of data streams from among which each of the weight generators is able to select a primary down-converted data stream to which an optimized set of adaptive filter weights generated by the down converter will be applicable, and at least one reference down-converted data stream.

10. A computer program product including
one or more non-transitory machine-readable mediums having instructions encoded thereon that, when executed by one or more processors, result in a plurality of operations for mitigating interference in a received wireless signal so as to provide a plurality of filtered output streams that are interference mitigated, the operations comprising:
creating a digital input data stream from the received wireless signal via an analog to digital converter (ADC);
deriving a down-converted data stream from the digital input data stream via a digital down converter (DDC);
generating an optimized set of adaptive filter weights via a weight generator according to the down-converted data stream and according to filtering feedback, wherein the adaptive filter weights remain valid at least during a period of validity;
applying digital filtering via a scrubber to the down-converted data stream according to the adaptive filter weights so as to produce at least one of the filtered output streams, wherein the scrubber is configured to continue using the adaptive filter weights;
and providing by the scrubber of the filtering feedback to the weight generator;
wherein the weight generator shares computational resources with the scrubber wherein the computational resources of the weight generator are available for other tasks after the weight generates the adaptive filter weights and the scrubber continues using the adaptive filter weights without further input from the weight generator.

11. The computer program product according to claim 10, wherein
there is no one-to-one correspondence between the weight generators and the scrubbers.

12. A method of mitigating interference in a received wireless signal, the method comprising:
providing a digital down converter (DDC) that is configured to convert a digital input data stream that is derived from the received wireless signal into a down-converted data stream;
providing a weight generator that is configured to generate an optimized set of adaptive filter weights according to the down-converted data stream and according to filtering feedback, wherein the adaptive filter weights remain valid at least during a period of validity;
providing a scrubber that is configured to apply digital filtering to the down-converted data stream according to the adaptive filter weights so as to produce at least one filtered output stream in which the interference is mitigated, the scrubber being further configured to provide the filtering feedback to the weight generator, wherein the scrubber is configured to continue using the adaptive filter weights; and
presenting a respective filtered output stream at each of a plurality of data outputs, the interference being mitigated in each of the filtered output streams;
wherein at least one of the DDC, the weight generator, and the scrubber is configured to perform calculations necessary to produce a plurality of the filtered output streams, and
wherein the method shares computational resources between the weight generator and the scrubber wherein the computational resources of the weight generator are available for other tasks for a time interval after the weight generator generates the adaptive filter weights without further input from the weight generator during the time interval.

13. The method of claim 12, wherein
the plurality of filtered output streams include a first output stream and a second output stream derived respectively from applying the digital filtering to distinct first and second of the down-converted data streams corresponding to first and second wireless signals received respectively at distinct first and second wireless receiver frequencies.

14. The method of claim 13, wherein
the received wireless signals include a signal of interest received at the first and second wireless frequencies during respective first and second timeslots of a frequency hopping spread spectrum (FHSS) protocol, and wherein the weight generator is configured to generate optimized sets of adaptive digital filter weights applicable to the first and second down-converted data streams during the first and second timeslots respectively.

15. The method of claim 14, wherein
the scrubber is configured to apply the digital filtering to the first down-converted data stream according to the first optimized set of adaptive filter weights during the first timeslot, and to apply the digital filtering to the second down-converted data stream according to the second optimized set of adaptive filter weights during the second timeslot.

16. The method of claim 13, wherein
the weight generator is configured to: calculate a first optimized set of adaptive filter weights applicable to the first down-converted data stream, the first optimized set of adaptive filter weights remaining valid during a time $t_v$ after the generation thereof;
and calculate during the time $t_v$ a second optimized set of adaptive filter weights that are applicable to the second down-converted data stream.

17. The method of claim 16, wherein
the method includes providing a first scrubber and a second scrubber, and wherein the first scrubber is configured to apply the digital filtering to the first down-converted data stream according to the first optimized set of adaptive filter weights, and wherein the second scrubber is configured to apply the digital filtering to the second down-converted data stream according to the second optimized set of adaptive filter weights.

18. The method of claim 12, wherein
the filtered output streams include a first multipath output stream and a second multipath output stream that correspond respectively to first and second down-converted data streams derived from first and second multipath copies of a signal of interest received at a wireless receiver frequency at distinct first and second multipath times, the second multipath time being delayed relative to the first multipath time.

19. The method of claim 18, wherein
the weight generator is configured to calculate an optimized set of adaptive filter weights according to the first down-converted data stream, the optimized set of adaptive filter weights remaining valid during a time tv after the generation thereof, and wherein during the time tv the computing device is configured to apply the digital filtering to both of the first and second down-converted data streams according to the optimized set of adaptive filter weights.

20. The method of claim 12, wherein:
the method comprises providing a plurality of digital down converters (DDCs) that are configured to provide a plurality of down-converted data streams derived from a plurality of digital input data streams, wherein each of the digital input data streams is associated uniquely with a corresponding one of the DDCs and with a corresponding one of the down-converted data streams; and the method further comprises providing a plurality of weight generators, each of the weight generators being configured to generate an optimized set of adaptive filter weights according to a plurality of the down-converted data streams; the down-converted data streams being provided as a bank of data streams from among which each of the weight generators selects a primary down-converted data stream to which an optimized set of adaptive filter weights generated by the weight generator is applied, and at least one reference down-converted data stream.

* * * * *